3,714,269
PROCESS FOR PRODUCING
2,6-DIMETHYLPHENOL
Ken Ito and Hiroshi Kaminaka, Toyonaka-shi, and Kunihisa Oie, Takarazuka-shi, Japan, assignors to Sumitomo Chemical Company, Ltd., Osaka, Japan
No Drawing. Filed Feb. 12, 1968, Ser. No. 704,529
Claims priority, application Japan, Feb. 15, 1967, 42/9,993
Int. Cl. C07c 37/12
U.S. Cl. 260—621 R       3 Claims

ABSTRACT OF THE DISCLOSURE 2,6-dimethylphenol is produced by reacting 4-tert.-butyl-2,6-dimethylphenol with phenol in the presence of sulfuric acid, toluene sulfonic acid, at a temperature of 120 to 180° C. for 0.5 to 6 hours, to effect a rearrangement of the tertiary butyl group from 4-tert.-butyl-2,6-dimethylphenol to phenol, and then rectifying the reaction product.

2,6-dimethylphenol (2,6-xylenol) is an important compound as a starting material for the new synthetic polyphenylene oxide resin.

2,6-dimethylphenol is low in solubility in water as an alkali salt and hence is difficult to be extracted from petroleum or coal tar. Further, it forms azeotropic mixture with other cresols or xylenols, so that it is impossible to obtain, by mere rectification, a product sufficiently high in purity so as to be usable as a starting material for polymers, and recrystallization or the like treatment is required, in practice, in addition to rectification.

In view of the above, various methods for the synthesis of 2,6-dimethylphenol have been proposed. According to these methods, however, the yield is not more than at most 60% or the by-production of other isomers is unavoidable, and thus no satisfactory process has been established yet.

The present inventors previously developed a novel process for producing in high yield 2,6-dimethylphenol substantially free from isomers by synthesizing 2,6-dimethyl-4-tert.-butylphenol from phenol and subjecting the synthesized compound to debutylation and obtained a Belgian patent under Pat. No. 695,121.

According to the process, 2,6-dimethylphenol is prepared, for example, by the process in which phenol is subjected to tertiary butylation to yield 4-tert.-butylphenol, the resultant 4-tert.-butylphenol is subjected to hydroxymethylation to yield 4-tert.-butyl-2,6-dihydroxymethylphenol, the resultant 4-tert.-butyl-2,6-dihydroxymethylphenol is subjected to reduction to yield 4-tert.-butyl-2,6-dimethylphenol, and finally the resultant 4-tert.-butyl-2,6-dimethylphenol is subjected to de-tertiary butylation to yield 2,6-dimethylphenol.

That is, this process is shown by the following scheme:

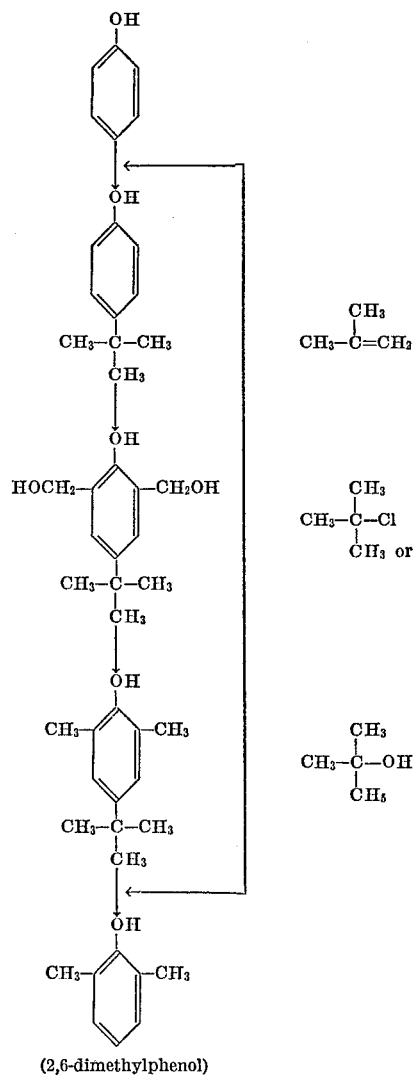

(2,6-dimethylphenol)

In this case, however, the tertiary butyl group in the 4-position separates in the form of isobutylene and hence should be recovered either as isobutylene or as tertiary butyl chloride by treatment with hydrochloric acid or as tertiary butyl alcohol by treatment with sulfuric acid. Subsequently, the thus recovered substance is treated with phenol to form 4-tert.-butylphenol and is then lead to 4-tert.-butyl-2,6-dimethylphenol. In this case, it is advantageous if the separated isobutylene can be utilized, without being recovered as isobutylene, tertiary butyl chloride or tertiary butyl alcohol, directly for the butylation reaction of phenol. Further, it is more advantageous, needless to say, if debutylation reaction and butylation reaction can be simultaneously effected in one reaction system.

Based on the above-mentioned idea, the present inventors made various studies on the process for preparing 2,6-dimethylphenol using phenol as a starting material. As the result, the present inventors have found that when 4-tert.-butyl-2,6-dimethylphenol is contacted with phenol at an elevated temperature in the presence of an acidic catalyst, a considerable amount of tertiary butyl group readily moves from the 2,6-dimethylphenol nucleus to the phenol nucleus. That is, the present inventors have attained a process in which the debutylation reaction of 4-tert.-butyl-2,6-dimethylphenol and the butylation reaction of phenol are simultaneously effected in one reaction system.

The present invention provides a process for producing 2,6-dimethylphenol which comprises reacting 4-tert.-butyl-2,6-dimethylphenol with phenol in the presence of an acidic catalyst selected from the group consisting of inorganic acid, metal halide and aromatic sulfonic acid at a temperature of 120° to 180° C. for 0.5 to 6 hours to yield 2,6-dimethylphenol and 4-tert.-butylphenol and separating by distillation 2,6-dimethylphenol from a mixture of 4-tert.-butylphenol, unreacted phenol, unreacted 4-tert.-butyl-2,6-dimethylphenol, by-produced 2-methylphenol and the catalyst.

If the process of the present invention is applied to a process for preparation of 2,6-dimethylphenol using phenol as a starting material, the process is shown by the following scheme.

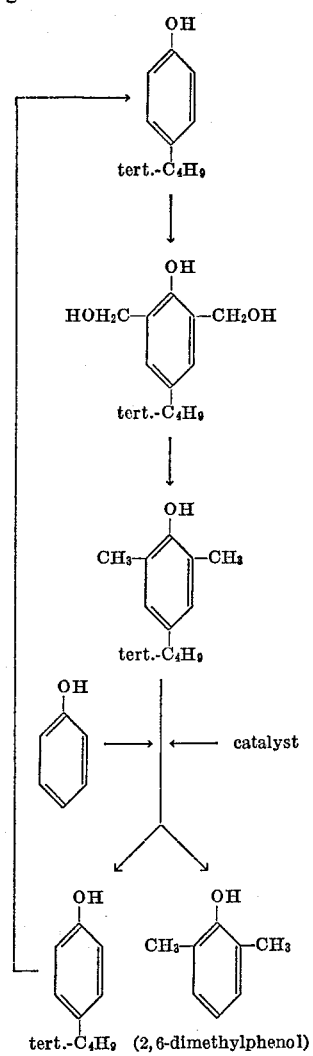

According to the thus established process of the present invention, therefore, decrease in number of required reaction steps, shortening of reaction time and reduction of butylation reaction apparatus and isobutylene recovery apparatus are brought about, with the result that the production cost of 2,6-dimethylphenol can be greatly lowered.

The reaction conditions of the present process will be explained in detail below.

The catalysts to be used in the present process include inorganic acids such as sulfuric, phosphoric and fluoric acids, halides such as aluminium chloride, titanium chloride, ferric chloride, zinc chloride, stannic chloride, boron fluoride and aluminium bromide, and aromatic sulfonic acids such as benzenesulfonic acid, toluene sulfonic acid, xylenesulfonic acid, naphthalenesulfonic acid and methyl-naphthalenesulfonic acid.

All these catalysts act as both butylation reaction catalysts and debutylation reaction catalysts and exhibit either of the butylation or debutylation activity depending on reaction conditions. In the practice of the present process, any of the above-mentioned catalysts are usable, but sulfuric acid and toluene sulfonic acid give particularly excellent results. The amount of catalyst to be used is 0.5–10%, preferably 2–5%, by weight based on the weight of 4-tert.-butyl-2,6-dimethylphenol.

The molar ratio of phenol to 4-tert.-butyl-2,6-dimethylphenol is theoretically 1:1. However, when this molar ratio is employed, the rearrangement rate of tertiary butyl group is low and a considerable amount of 4-tert.-butyl-2,6-dimethylphenol is left unreacted. The rearrangement rate of tertiary butyl group increases with increasing proportion of phenol, but the use of excessively large amount of phenol is uneconomical because a large cost is required for the recovery thereof. Generally, phenol is used in a proportion of from 1 to 7 moles, preferably from 2 to 4 moles, per mol of 4-tert.-butyl-2,6-dimethylphenol.

In the process of the present invention, it is not always necessary to employ a reaction solvent. It is rather better than to employ such solvent to employ an excess amount of phenol, because sometimes the presence of such solvent prevents the butylation of phenol.

The reaction temperature adopted in the present process is lower than that employed in a conventional debutylation reaction. In a conventional debutylation reaction, the separation of isobutylene is slightly observed at about 150° C., but the real reaction progresses at a temperature within the range of from 200° to 250° C. However, in the present process in which the rearrangement of tertiary butyl group is observed, the reaction proceeds even at 80° to 100° C. and quickly progresses at above 130° C. This temperature is far lower than that in the debutylation reaction, and thus the present process has such advantage that the occurrence of side reactions such as demethylation and the like is inhibited, as will be explained later.

The rearrangement reaction of tertiary butyl group in accordance with the present process is a kind of equilibrium reaction, like in the case of debutylation reaction, and the rearrangement proportion of tertiary butyl group is definite at each reaction temperature. Therefore, when the reaction temperature is maintained constant, the rearrangement proportion, after reaching a definite value, does not vary, no matter how the reaction time is prolonged. Of course, the rearrangement proportion increases with increasing reaction temperature. For example, at a reaction temperature of 100° C., about 10 mol percent of 4-tert.-butyl-2,6-dimethylphenol charged in the reaction system converts into 2,6-dimethylphenol, and at 130° C. and 160° C., there is observed the rearrangement of tertiary butyl group in proportions of about 60 mol percent and about 70 mol percent, respectively. That is, the higher the reaction temperature, the greater the rearrangement proportion of tertiary butyl group. It is able to give a larger amount of 2,6-dimethylphenol within a definite reaction time at higher temperature. What is to be noted here, however, is that with increasing reaction temperature, there also occurs the debutylation reaction of 4-tert.-butylphenol, which is formed by the rearrangement of tertiary butyl group to the phenol nucleus and which is to be used as a starting material for the subsequent reaction. In case the reaction temperature is excessively high, e.g. above 180° C., only less than about 60% of the tertiary butyl group separated from 4-tert.-butyl-2,6-dimethylphenol is rearranged to the phenol nucleus, and more than about 40% thereof is converted into isobutylene and escapes out of the reaction system. Considering the above facts, the reaction temperature is preferably 120° to 180° C., and the reaction terminates within 30 minutes to 6 hours, ordinarily 2 to 4 hours, though the reaction time varies depending on the reaction temperature.

Reaction results attained in the case where the present process has been employed vary depending on the reaction conditions. Ordinarily, however, the results as shown below are attained.

That is, 60–75 mol percent of fed 4-tert.-butyl-2,6-dimethylphenol is converted into 2,6-dimethylphenol, and at least 85%, ordinarily 95–98%, of the separated tertiary butyl group is rearranged to the phenol nucleus and is recovered as 4-tert.-butylphenol, starting material, for the subsequent reaction.

When 2,6-dimethylphenol and 4-tert.-butylphenol are removed from reaction mass and unreacted 4-tert.-butyl-2,6-dimethylphenol is heated with the newly added phenol and catalyst, the rearrangement reaction takes place again. The amount of 2,6-dimethylphenol attained by deducting unreacted material from fed 4-tert.-butyl-2,6-dimethylphenol, i.e. the yield of 2,6-dimethylphenol based on the consumed 4-tert.-butyl-2,6-dimethylphenol, reaches 95% or more. In addition, 2-methylphenol (O-cresol) is partly by-produced, but the amount thereof is less than 1%, ordinarily less than 0.5%, based on the 2,6-dimethylphenol.

After completion of the reaction, the product in accordance with the present process is subjected to rectification to be divided into unreacted phenol, by-produced 2-methylphenol, 2,6-dimethylphenol, 4-tert.-butylphenol and 4-tert.-butyl-2,6-dimethylphenol. The unreacted phenol, 2-methylphenol and 4-tert.-butyl-2,6-dimethylphenol are recycled to the tert.-butyl group rearrangement reaction step, and the 4-tert.-butylphenol is recycled to the dihydroxymethylation step.

It is needless to say that the present process can be effected in both batchwise and continuous manner.

In the above, the present process has been explained with reference to the tertiary butyl group as a tertiary alkyl group, because the application of the present process to tertiary butyl group is most easily utilizable on commercial scale. It is needless to say that substantially the same results can be obtained in the case of other tertiary alkyl groups.

The following examples illustrate the present invention. All parts are based by weight.

EXAMPLE 1

To a reaction vessel provided with a stirrer, a thermometer and a cooler, 356 parts of 4-tert.-butyl-2,6-dimethylphenol, 470 parts of phenol and 11 parts of p-toluenesulfonic acid as a catalyst were added, and the mixture was heated with stirring. The reaction was effected for 3 hours at an inner temperature of 157°–162° C. After completion of the reaction, the temperature was lowered to about 80° C., and then 8 parts of soda ash was added and the mixture was stirred for about 20 minutes. After cooling the reaction mixture to 30°–40° C., sodium p-toluenesulfonate was removed by filtration to obtain about 570 parts of a reaction product.

As the result of analysis of the reaction product, it was clarified that 167.6 parts of 2,6-dimethylphenol, 216 parts of 4-tert.-butylphenol and 0.6 part of 2-methylphenol had been produced, and 99.6 parts of 4-tert.-butyl-2,6-dimethylphenol had been left. That is, 72% of fed 4-tert.-butyl-2,6-dimethylphenol had reacted, 95.5% of the consumed 4-tert.-butyl-2,6-dimethylphenol had converted into 2,6-dimethylphenol and 0.4% of 2-methylphenol had been by-produced. Further, 97.5% of separated isobutylene had been collected as the 4-tert.-butylphenol.

EXAMPLE 2

To the same reaction vessel as in Example 1, 178 parts of 4-tert.-butyl-2,6-dimethylphenol, 376 parts of phenol and 8 parts of concentrated sulfuric acid as a catalyst were added, and the mixture was heated at 180° C. for 2 hours. As the result, 23% of fed- 4-tert.-butyl-2,6-dimethylphenol was left unreacted, 95% of the consumed 4-tert.-butyl-2,6-dimethylphenol was converted into 2,6-dimethylphenol, and 0.9% of 2-methylphenol was by-produced. Further, 89.5% of separated isobutylene was recovered as 4-tert.-butylphenol.

What we claim is:

1. A process for producing 2,6-dimethylphenol and 4-tertiary-butylphenol simultaneously without producing cresols except ortho-cresol and xylenols as by-products, which comprises reacting 2,6-dimethyl-4-tertiary-butylphenol with phenol in the presence of 2 to 5% by weight, based on the weight of 2,6-dimethyl-4-tertiary-butylphenol, of an acidic catalyst selected from the group consisting of sulfuric acid and toluene sulfonic acid at a temperature of 120° to 180° C.

2. A process according to claim 1, wherein the molar ratio of 2,6-dimethyl-4-tertiary-butylphenol to phenol is 1:1–7.

3. A process according to claim 1, wherein the reaction time is 0.5 to 6 hours.

References Cited

UNITED STATES PATENTS

| | | | |
|---|---|---|---|
| 1,972,599 | 9/1934 | Perkins et al. | 260—621 X |
| 2,189,805 | 2/1940 | Kyrides | 260—621 X |
| 2,206,924 | 7/1940 | Stevens et al. | 260—621 X |
| 2,351,347 | 6/1944 | Luten | 260—624 C X |
| 2,435,087 | 1/1948 | Luten et al. | 260—624 C X |

LEON ZITVER, Primary Examiner

N. MORGENSTERN, Assistant Examiner

U.S. Cl. X.R.

260—624 R, 641, 621 K, 663, 677 R, 624 C, 621 D